United States Patent
Hirasaki (10) Patent No.: US 7,778,475 B2
(45) Date of Patent: Aug. 17, 2010

(54) MOTION PICTURE PROCESSING DEVICE

(75) Inventor: Shinya Hirasaki, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 805 days.

(21) Appl. No.: 11/730,632

(22) Filed: Apr. 3, 2007

(65) Prior Publication Data

US 2007/0286285 A1 Dec. 13, 2007

(30) Foreign Application Priority Data

Jun. 13, 2006 (JP) ............................. 2006-163000

(51) Int. Cl.
 *G06K 9/36* (2006.01)
(52) U.S. Cl. .................. 382/232; 375/240.16
(58) Field of Classification Search ................ 382/232, 382/236, 238; 375/240.16
See application file for complete search history.

(56) References Cited

U.S. PATENT DOCUMENTS 6,947,603 B2 * 9/2005 Kim ............................ 382/236
7,116,830 B2 * 10/2006 Srinivasan ................... 382/236
2002/0114393 A1 * 8/2002 Vleeschouwer ........ 375/240.16

FOREIGN PATENT DOCUMENTS

JP 2002-245022 8/2002

* cited by examiner

*Primary Examiner*—Duy M Dang
(74) *Attorney, Agent, or Firm*—Studebaker & Brackett PC; Donald R. Studebaker

(57) ABSTRACT

A motion picture processing device has: an input circuit having a buffer memory, an image data taking-in section and a bus interface; a motion estimation circuit; an encoding circuit; and a failure control circuit having a counter and an enabling signal outputting section. When an enabling signal is supplied, the image data taking-in section takes-in image data, and when image data of one screen is stored in the buffer memory, the image data taking-in section outputs a valid signal. The encoding circuit compresses and encodes image data, and, when the encoding circuit finishes external output of an output signal, the encoding circuit outputs an end signal. The counter increments a count value due to the valid signal, and decrements the count value due to the end signal. When the count value reaches a number of regions of the memory circuit, the failure control circuit stops output of the enabling signal.

2 Claims, 7 Drawing Sheets

MOTION PICTURE PROCESSING DEVICE OF FIRST EMBODIMENT OF PRESENT INVENTION

F I G. 1

MOTION PICTURE PROCESSING DEVICE OF FIRST EMBODIMENT OF PRESENT INVENTION

OPERATION OF FIG. 2

FIG. 4

OPERATION OF FIG. 1

FIG. 5

MOTION PICTURE PROCESSING DEVICE OF SECOND EMBODIMENT OF PRESENT INVENTION

F I G. 6

OPERATION OF FIG. 5

FIG. 7

COMPARISON OF OPERATIONS OF FIRST EMBODIMENT AND SECOND EMBODIMENT

MOTION PICTURE PROCESSING DEVICE

CROSS-REFERENCE TO RELATED APPLICATION

This application claims priority under 35 USC 119 from Japanese Patent Application No. 2006-163000, the disclosure of which is incorporated by reference herein.

BACKGROUND OF THE INVENTION

1. Field of the Invention

The present invention relates to a motion picture processing device which processes a motion picture in real time by pipeline processing, and in particular, relates to processing at the time when a failure, in which processing of image data is not completed within a prescribed time period, arises.

2. Description of the Related Art

Figure 2:
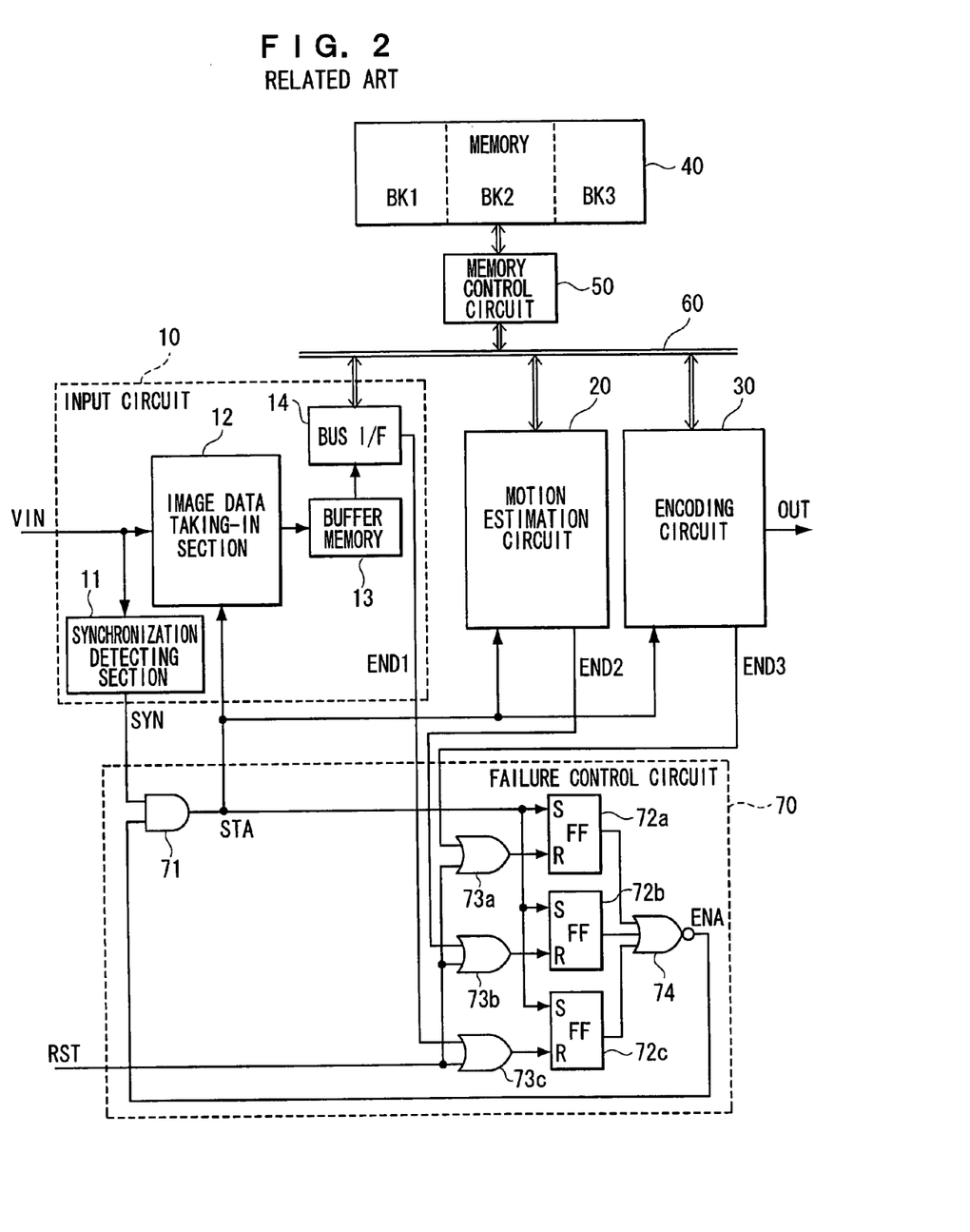
FIG. 2 is a structural drawing of a conventional motion picture processing device.

FIG. 2 is a structural view of a conventional motion picture processing device.

This motion picture processing device processes and encodes, in real time, image data which is outputted from a video camera. The motion picture processing device has: a pipeline processing circuit formed by an input circuit 10, a motion estimation circuit 20 and an encoding circuit 30; a memory 40 which is used as a buffer for the transfer of data which is being processed in the pipeline processing; and a memory control circuit 50. The input circuit 10, the motion estimation circuit 20, and the encoding circuit 30 are connected to the memory control circuit 50 via a bus 60. Further, the motion picture processing device has a failure control circuit 70 which effects control such that the pipeline processing does not fall into an abnormal state.

The input circuit 10 takes-in an image signal VIN supplied from a video camera, and writes image data in the memory 40 in units of one frame. The input circuit 10 has: a synchronization detecting section 11 detecting and outputting a vertical synchronous signal SYN from the image signal VIN; an image data taking-in section 12 which takes-in the image data which is in the image signal VIN in accordance with a start signal STA supplied from the failure control circuit 70; a buffer memory 13 temporarily holding the taken-in image data; and a bus interface (hereinafter called "bus I/F") 14 for writing the image data, which is held in the buffer memory 13, to the memory 40 via the bus 60. At the point in time when the bus I/F 14 writes, to the memory 40, the image data of one frame which is in the buffer memory 13, the bus I/F 14 outputs an end signal END1 to the failure control circuit 70.

The motion estimation circuit 20 carries out motion searching with respect to the image data which the input circuit 10 and the encoding circuit 30 write to the memory 40, and outputs the results thereof to the memory 40. The encoding circuit 30 carries out encoding processing other than the motion searching, and generates MPEG-4 (Motion Picture Expert Group 4) encoded data and writes the reconstructed image to the memory 40, and outputs it as output data OUT. The motion estimation circuit 20 and the encoding circuit 30 start processings in accordance with the start signal STA supplied from the failure control circuit 70, and, at the points in time when the processings thereof end, output end signals END2, END3, respectively, to the failure control circuit 70.

The memory 40 is a 3-bank structure of banks BK1, BK2, BK3, and data needed for the processing of image data of one frame is written to each of the banks BK1 through BK3. Further, the respective circuits which are the input circuit 10, the motion estimation circuit 20, and the encoding circuit 30 use the banks in order from the bank BK1, and, when the bank BK3 is used, the bank BK1 is used again.

On the other hand, when the failure that the processing of the image data is not completed within the prescribed time period arises, the failure control circuit 70 prevents the pipeline processing from falling into an abnormal state by stopping output of the start signal STA. For example, the failure control circuit 70 has an AND gate (hereinafter called "AND") 71 which gate-controls, by an operation enabling signal ENA, the vertical synchronous signal SYN supplied from the input circuit 10, and supplies it as the start signal STA to the input circuit 10, the motion estimation circuit 20, and the encoding circuit 30.

The start signal STA is supplied to set terminals S of set-reset-type flip-flops (hereinafter called "FFs") 72a, 72b, 72c within the failure control circuit 70. The end signals END1 through END3 from the input circuit 10, the motion estimation circuit 20, and the encoding circuit 30 are supplied to reset terminals R of the FFs 72a through 72c via two-input OR gates (hereinafter called "ORs") 73a, 73b, 73c, respectively. Further, a system reset signal RST is supplied to the other input sides of the ORs 73a through 73c. The output sides of the FFs 72a through 72c are connected to a three-input NOR gate (hereinafter called "NOR") 74. The operation enabling signal ENA is outputted from the NOR 74 and is supplied to the AND 71.

Figure 3:
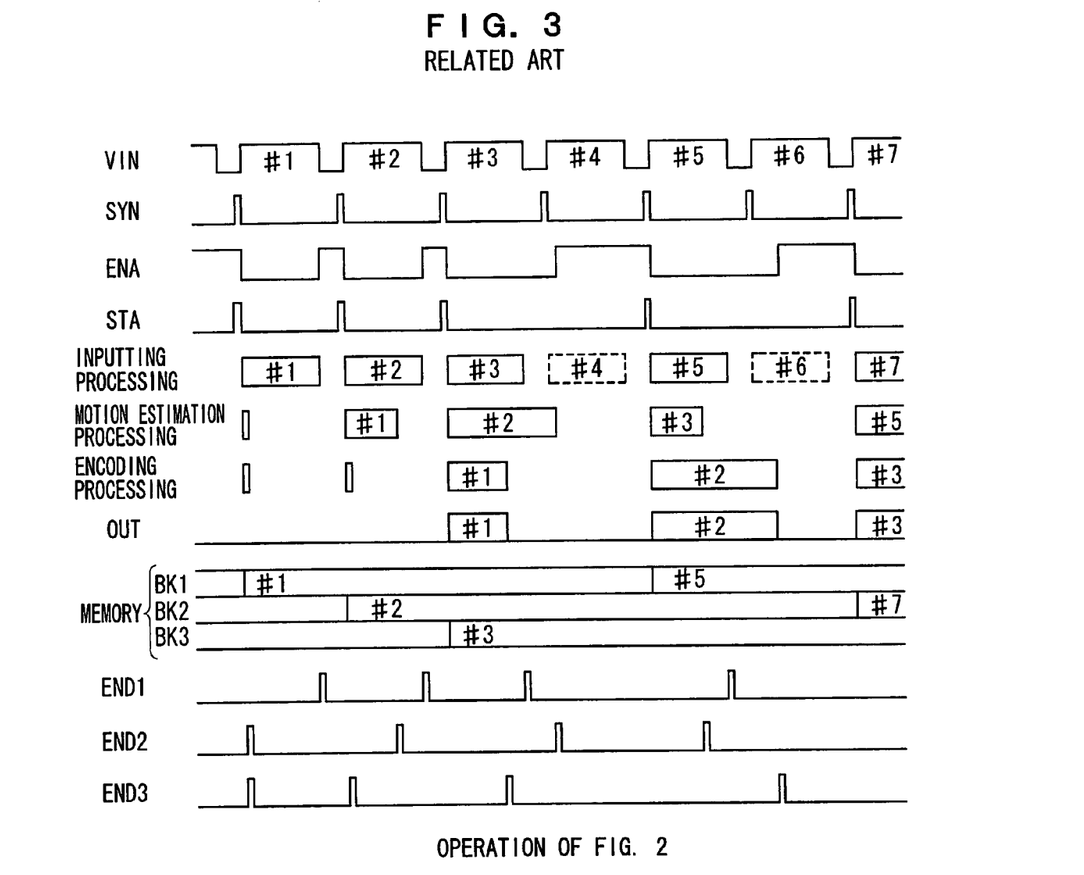
FIG. 3 is a signal waveform diagram showing operation of FIG. 2.

FIG. 3 is a signal waveform diagram showing the operation of FIG. 2. Hereinafter, operation of FIG. 2 will be described with reference to FIG. 3.

Image data #1, #2, #3, . . . , which are sectioned from the video camera into respective one frames in vertical synchronization, are supplied to the input circuit 10 at constant periods as the image signal VIN. At the synchronization detecting section 11, the vertical synchronization intervals, in which the image data #1, #2, #3 . . . do not exist, in the image signal VIN are detected, and the vertical synchronous signal SYN is outputted to the failure control circuit 70 at constant periods.

The FFs 72a through 72c within the failure control circuit 70 are all reset by the system reset signal RST which is supplied at the time when operation starts. Therefore, the operation enabling signal ENA outputted from the NOR 74 is level "H". In this way, the start signal STA is outputted from the AND 71 at the same timing as the vertical synchronous signal SYN, and is supplied to the input circuit 10, the motion estimation circuit 20, and the encoding circuit 30. The start signal STA is further supplied to the FFs 72a through 72c, these FFs 72a through 72c are reset, and the operation enabling signal ENA becomes level "L".

When the image data #1 is taken-in by the image data taking-in section 12, the input circuit 10 starts inputting processing, such as writing the image data #1 to the bank BK1 of the memory 40, and the like. On the other hand, at the motion estimation circuit 20 and the encoding circuit 30, because image data to be processed does not exist, the end signals END1, END2 are outputted immediately. In this way, the FFs 72b, 72c are reset. When the input circuit 10 has taken-in all of the image data #1 and written it to the bank BK1 of the memory 40, the input circuit 10 outputs the end signal END1, and the FF 72a is reset. In this way, the operation enabling signal ENA becomes "H".

Due to the start signal STA corresponding to the next vertical synchronous signal SYN, the input circuit 10 carries out inputting processing of taking-in the image data #2 and writing it to the bank BK2 of the memory 40, and the motion estimation circuit 20 carries out motion estimation processing with respect to the image data #1 in the bank BK1. On the other hand, at the encoding circuit 30, because image data to be processed does not exist, the end signal END2 is outputted immediately. At the points in time when their respective processings are ended, the input circuit 10 and the motion estimation circuit 20 output the end signals END1, END2.

Due to the start signal STA corresponding to the next vertical synchronous signal SYN, the input circuit 10 carries out inputting processing of taking-in the image data #3 and writing it to the bank BK3, and the motion estimation circuit 20 carries out motion estimation processing with respect to the image data #2 in the bank BK2. On the other hand, the encoding circuit 30 carries out encoding processing of the image data #1 in the bank BK1, and outputs it as the output data OUT. At the points in time when their respective processings are ended, the input circuit 10, the motion estimation circuit 20, and the encoding circuit 30 output the end signals END1, END2, END3.

Here, if the processing of the motion estimation circuit 20 is delayed due to competition of the bus 60 or the like and is not finished by the time corresponding to the next vertical synchronous signal SYN, the FF 72b is not reset, and the operation enabling signal ENA remains "L". Therefore, output of the next start signal STA is suppressed, and the inputting processing of image data #4 by the input circuit 10 cannot be carried out. Thereafter, at the point in time when the processing of the motion estimation circuit 20 is ended, the end signal END2 is outputted, and the operation enabling signal ENA becomes "H".

Due to the start signal STA corresponding to the next vertical synchronous signal SYN, the input circuit 10 carries out the inputting processing of taking-in image data #5 and writing it to the bank BK1, and the motion estimation circuit 20 carries out motion estimation processing with respect to the image data #3 in the bank BK3, and the encoding circuit 30 carries out encoding processing of the image data #2 in the bank BK2 and outputs the output data OUT. Here, if the processing of the encoding circuit 30 is delayed due to competition of the bus 60 or the like and is not finished by the time corresponding to the next vertical synchronous signal SYN, the FF 72c is not reset, and the operation enabling signal ENA remains "L". Therefore, output of the next start signal STA is suppressed, and the inputting processing of image data #6 by the input circuit 10 cannot be carried out. Thereafter, at the point in time when the processing of the encoding circuit 30 is finished, the end signal END3 is outputted, and the operation enabling signal ENA becomes "H".

In this way, the motion picture processing device of FIG. 2 has the failure control circuit 70 which, when all of the processings of the input circuit 10, the motion estimation circuit 20, and the encoding circuit 30 are ended within the time period of one frame, outputs the operation enabling signal ENA for causing inputting processing of the next image data to be carried out. Therefore, if the failure that processing of the image data is not completed within a prescribed time period (the time period of one frame) arises, the pipeline processing can be prevented from falling into an abnormal state.

However, in the above-described motion picture processing device, if there exists even one circuit at which processing is not ended among the input circuit 10, the motion estimation circuit 20, and the encoding circuit 30, the processing of taking-in the next image data is suppressed. Therefore, the frequency of image data which is not taken-in and which is thinned-out becomes large, and there is the concern that the quality of the motion picture which is outputted as the output data OUT will deteriorate.

SUMMARY OF THE INVENTION

The present invention has been made in view of the above circumstances, and provides a motion picture processing device comprising: an input circuit comprising: a buffer memory temporarily holding image data which is supplied at a constant period in accordance with a synchronous signal, an image data taking-in section starting taking-in of the image data in accordance with the synchronous signal when an enabling signal is being supplied, and outputting a valid signal at a point in time when taken-in image data of one screen is stored in the buffer memory, and a bus interface storing the image data of the one screen, which is held in the buffer memory, via a common bus in one region of a memory circuit which has three or more regions, and, when the bus interface ends storing, the bus interface outputs a first end signal; a motion estimation circuit connected to the memory circuit via the common bus, and searching motion of an image on the basis of latest image data stored in the one region of the memory circuit and image data therebefore stored in other regions, and generating motion data and storing the motion data in a same region as the latest image data, and, when the motion estimation circuit ends storing, the motion estimation circuit outputs a second end signal; an encoding circuit connected to the memory circuit via the common bus, and, when the first end signal is supplied, the encoding circuit compresses and encodes the latest image data and the motion data which are stored in the one region of the memory circuit and outputs an output signal to an exterior, and, when the encoding circuit ends outputting, the encoding circuit outputs a third end signal; and a failure control circuit comprising: a counter counting a number of regions in use at the memory circuit by incrementing a count value due to the valid signal and decrementing the count value due to the third end signal, and an enabling signal outputting section outputting the enabling signal when the count value of the counter is less than a number of regions of the memory circuit, and stopping output of the enabling signal when the count value reaches the number of regions of the memory circuit.

BRIEF DESCRIPTION OF THE DRAWINGS

Preferred embodiments of the present invention will be described in detail based on the following figures, wherein.

DETAILED DESCRIPTION OF THE INVENTION

The above and other objects and novel features of the present invention will become completely apparent when the following description of preferred embodiments is read in conjunction with the accompanying drawings. However, the drawings are only for explanation, and are not intended to limit the scope of the present invention.

First Embodiment

Figure 1:
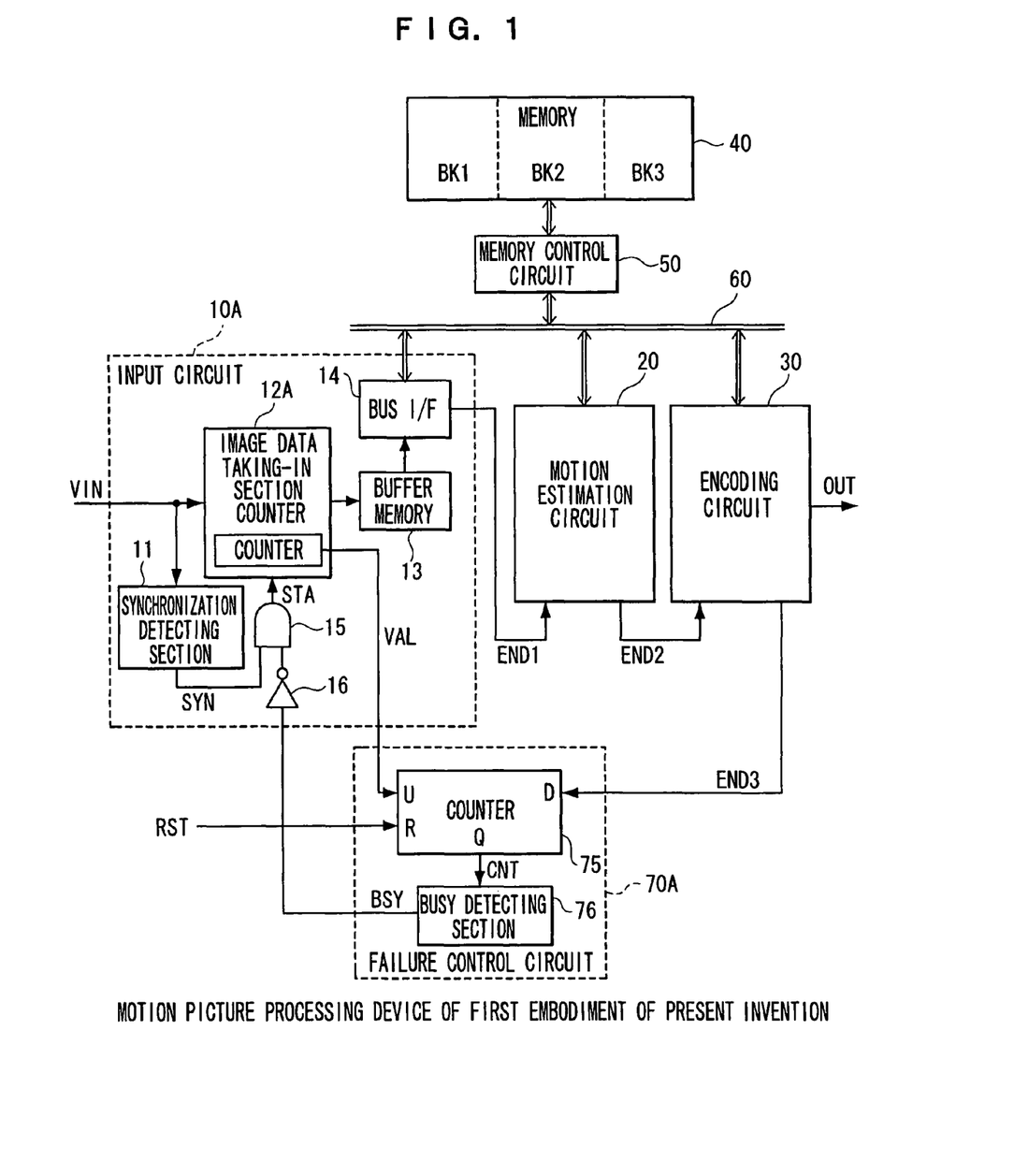
FIG. 1 is a structural drawing of a motion picture processing device showing a first embodiment of the present invention.

FIG. 1 is a structural drawing of a motion picture processing device showing a first embodiment of the present invention. Elements in FIG. 1 which are common to those in FIG. 2 are denoted by common reference numerals.

This motion picture processing device processes and encodes, in real time, the image signal VIN which is supplied from an unillustrated video camera or the like. The motion picture processing device has: a pipeline processing circuit formed by an input circuit 10A, the motion estimation circuit 20 and the encoding circuit 30; the memory 40 which is used as a buffer for transfer of data which is being processed in the pipeline processing; and the memory control circuit 50. The input circuit 10A, the motion estimation circuit 20, and the encoding circuit 30 are respectively connected to the memory control circuit 50 via the bus 60. Further, the motion picture processing device has a failure control circuit 70A which effects control such that the pipeline processing does not fall into an abnormal state.

The input circuit 10A takes-in the image data from the image signal VIN, and writes the image data in the memory 40 in units of one frame. The input circuit 10A has: the synchronization detecting section 11 detecting and outputting the vertical synchronous signal SYN from the image signal VIN; an image data taking-in section 12A which takes-in the image data from the image signal VIN in accordance with the start signal STA which is generated on the basis of the vertical synchronous signal SYN; the buffer memory 13 temporarily holding the taken-in image data; and the bus I/F 14 for writing the image data, which is held in the buffer memory 13, to the memory 40 via the bus 60.

The input circuit 10A further has a two-input AND 15. The vertical synchronous signal SYN is supplied to one input terminal of the AND 15. A busy signal BSY from the failure control circuit 70A is inverted at an inverter 16 and supplied to the other input terminal of the AND 15. The start signal STA is outputted from the output terminal of the AND 15, and is supplied to the image data taking-in section 12A.

Note that the image data taking-in section 12A counts the number of times of taking-in of the image data into the buffer memory 13. When the necessary number of times of taking-in which corresponds to the image size of one screen is finished, the image data taking-in section 12A outputs a valid signal VAL to the failure control circuit 70A. Further, the bus I/F 14 counts the number of times of transfer of image data to the memory 40 via the bus 60. When the necessary number of times of transfer which corresponds to the image size of one screen is finished, the bus I/F 14 outputs the end signal END1 to the motion estimation circuit 20 as an activating signal.

The motion estimation circuit 20 carries out motion searching with respect to the image data which the input circuit 10A and the encoding circuit 30 write to the memory 40, and outputs the results thereof to the memory 40. The motion estimation circuit 20 starts processing with the end signal END1 supplied from the input circuit 10A being an activating signal, and, at the point in time when processing is finished, outputs the end signal END2 as an activating signal for the encoding circuit 30.

The encoding circuit 30 carries out encoding processing other than the motion searching, such as, for example, discrete cosine transform, quantization, variable length encoding, inverse discrete cosine transform, inverse quantization, motion compensation, and the like, and generates MPEG-4 encoded data and outputs the reconstructed image to the memory 40, and outputs it to the exterior as the output data OUT. The encoding circuit 30 starts processing with the end signal END2 supplied from the motion estimation circuit 20 being an activating signal, and, at the point in time when processing is finished, outputs the end signal END3 to the failure control circuit 70A.

The memory 40 has three regions which are the banks BK1, BK2, BK3, and data needed for the processing of image data of one frame is written to each of the banks BK1 through BK3. Further, the respective circuits which are the input circuit 10A, the motion estimation circuit 20, and the encoding circuit 30 use the banks in order from the bank BK1, and, when the bank BK3 is used, the bank BK1 is used again.

The failure control circuit 70A prevents the pipeline processing from falling into an abnormal state, by outputting the busy signal BSY when all of the banks BK1 through BK3 of the memory 40 are in a state of being used and image data of a new frame cannot be written. The failure control circuit 70A has a counter 75, whose count value CNT is increased by one by the valid signal VAL supplied from the input circuit 10A and whose count value CNT is decreased by one by the end signal END3 supplied from the encoding circuit 30, and a busy detecting section 76, which outputs the busy signal BSY when the count value CNT of the counter 75 is 3. Note that the count value CNT of the counter 75 is reset to 0 by the system reset signal RST.

Figure 4:
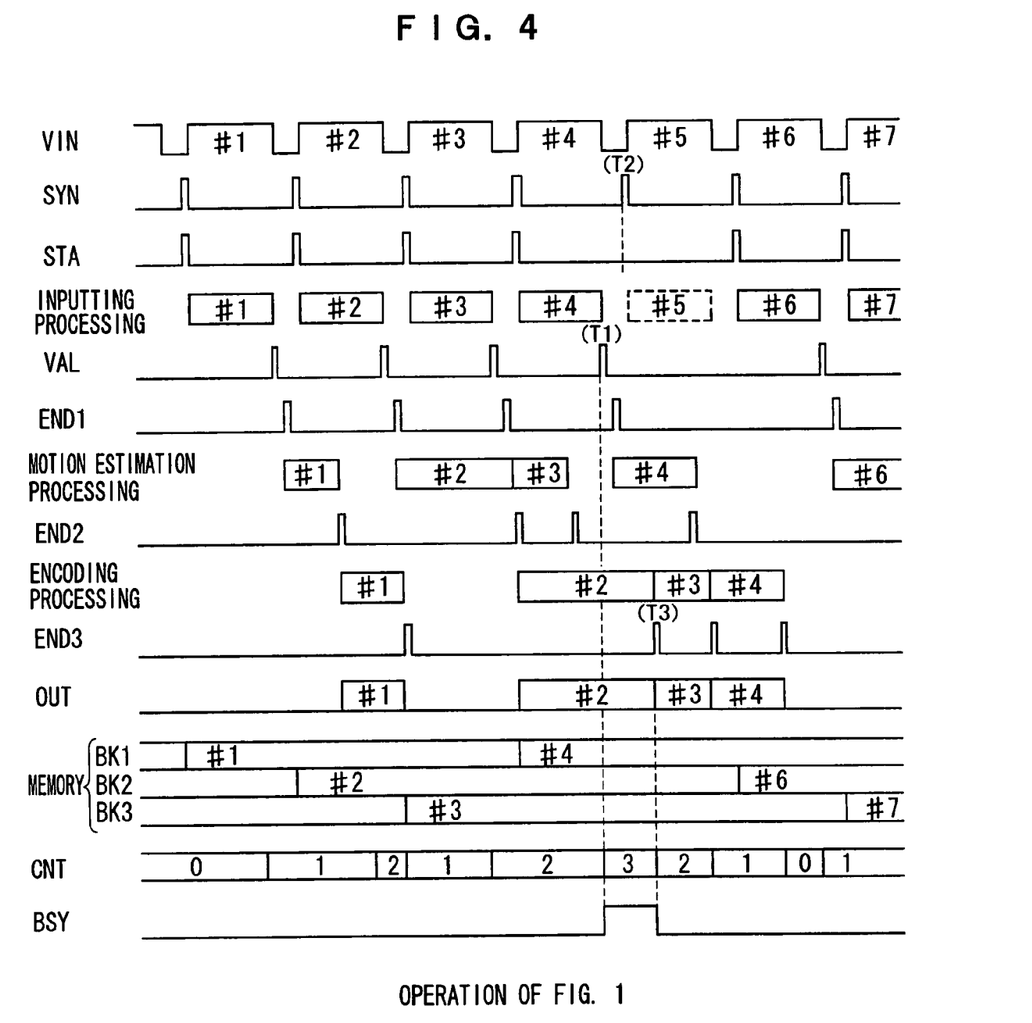
FIG. 4 is a signal waveform diagram showing operation of FIG. 1.

FIG. 4 is a signal waveform diagram showing the operation of FIG. 1. Hereinafter, operation of FIG. 1 will be described with reference to FIG. 4.

(1) The image signal VIN, which has vertical synchronization intervals in which image data does not exist before the image data #1, #2, #3 . . . in order to show that there is valid data for each one frame from the video camera or the like, is supplied. Further, by the system reset signal RST which is supplied at the time when operation starts, the counter 75 within the failure control circuit 70A is reset such that the count value CNT becomes 0. In this way, the busy signal BSY which is outputted from the busy detecting section 76 becomes "L".

(2) The synchronization detecting section 11 of the input circuit 10A detects the vertical synchronization intervals from the image signal VIN, and outputs the vertical synchronous signal SYN to the AND 15. At this time, because the busy signal BSY is "L", the start signal STA is supplied from the AND 15 to the image data taking-in section 12A. The image data taking-in section 12A starts the taking-in of the image data #1 from the time corresponding to a set image data amount, and successively stores the taken-in image data #1 in the buffer memory 13. On the other hand, the bus I/F 14 successively writes, to the bank BK1 of the memory 40, the image data #1 which is stored in the buffer memory 13. When the image data #1 stored in the buffer memory 13 reaches the necessary amount corresponding to one screen, the image data taking-in section 12A outputs the pulse-shaped valid signal VAL. Further, when the bus I/F 14 writes, to the bank BK1, all of the image data #1 stored in the buffer memory 13, the bus I/F 14 outputs the pulse-shaped end signal END1 to the motion estimation circuit 20.

(3) The count value CNT of the counter 75 in the failure control circuit 70A is increased due to the valid signal VAL supplied from the input circuit 10A, and becomes 1. Namely, this shows that one bank of the memory 40 is being used.

(4) The motion estimation circuit 20 is activated by the end signal END1 supplied from the input circuit 10A, and starts motion estimation processing. In this motion estimation processing, the image data #1 stored in the bank BK1 of the memory 40, and the image data therebefore stored in the banks BK2, BK3, are read-out as needed, and motion information is extracted, and the extracted processing results are written to the bank BK1. At the point in time when processing of the image data #1 ends, the motion estimation circuit 20 outputs the pulse-shaped end signal END2 to the encoding circuit 30.

(5) The encoding circuit 30 is activated by the end signal END2 supplied from the motion estimation circuit 20, and starts encoding processing. In the encoding processing, the image data #1 and the results of the motion estimation processing, which are stored in the bank BK1 of the memory 40, are read-out, MPEG-4 encoded data is generated and the reconstructed image is stored in the memory 40, and is outputted to the exterior as the output data OUT. At the point in time when the encoding processing of the image data #1 ends, the encoding circuit 30 outputs the pulse-shaped end signal END3 to the failure control circuit 70A.

(6) The count value CNT of the counter 75 in the failure control circuit 70A is decreased by 1 due to the end signal END3 supplied from the encoding circuit 30. Namely, this means that one of the banks which was being used in the memory 40 has been released.

In above (1) through (6), description is given of the operations of the respective circuits structuring the pipeline processing circuit, by focusing on the initial image data #1 which is supplied as the image signal VIN. However, similar processings on the image data from the second image data #2 on are carried out continuously and in parallel by the input circuit 10A, the motion estimation circuit 20, and the encoding circuit 30.

(7) The count value CNT of the counter 75 in the failure control circuit 70A is increased by 1 due to the valid signal VAL supplied from the input circuit 10A, and is decreased by 1 due to the end signal END3 supplied from the encoding circuit 30. Namely, the count value CNT of the counter 75 represents the number of banks of the memory 40 which are being used. Accordingly, a case in which the count value CNT is 3 means that all of the banks of the memory 40 are being used and there does not exist a bank for the writing of image data of a new frame. Therefore, as shown at time T1 in FIG. 4, when the count value CNT becomes 3 due to the valid signal VAL, the busy signal BSY outputted from the busy detecting section 76 becomes "H".

(8) At the input circuit 10A, when the supplied busy signal BSY becomes "H", as shown at time T2, the vertical synchronous signal SYN is masked by the AND 15, and the start signal STA for the image data taking-in section 12A is stopped. In this way, taking-in of the image data #5 is suppressed. Accordingly, the valid signal VAL corresponding to this image data #5 also is not outputted, and therefore, the count value CNT does not exceed 3.

(9) At time T3, when the end signal END3 is outputted from the encoding circuit 30, the count value CNT of the counter 75 becomes 2, and the busy signal BSY becomes "L". In this way, at time T4, when the synchronization detecting section 11 of the input circuit 10A detects the vertical synchronization interval and outputs the vertical synchronous signal SYN, this vertical synchronous signal SYN is supplied from the AND 15 to the image data taking-in section 12A as the start signal STA, and the processing of taking-in image data by the image data taking-in section 12A is restarted.

As described above, in the motion picture processing device of the first embodiment, the busy signal BSY is generated at the timing of the valid signal VAL which is outputted at the point in time when the image data taking-in section 12A completes taking-in of image data into the buffer memory 13, and the timing of judging whether or not the failure of overwriting the memory 40 will arise is made to be the point in time of the start of taking-in of the image data, i.e., the timing of the vertical synchronous signal SYN.

If the end signal END1, which is generated at the point in time when writing of image data to the memory 40 is completed, is used when judging whether or not image data is to be taken-in at the input circuit 10A, there are cases in which the writing from the input circuit 10A to the memory 40 is made to wait due to competition of the bus 60, and the end signal END1 is generated after the vertical synchronous signal SYN of the next frame is detected at the input circuit 10A. Therefore, if the failure control circuit judges, by the end signal END1, whether or not taking-in of image data is possible, the output of the busy signal BSY is later than the vertical synchronous signal SYN, and, at the input circuit 10, taking-in of the next frame cannot be suppressed. Accordingly, the problem arises that the image data of the next frame is overwritten to the bank which is in the midst of the processing at the encoding circuit 30.

In contrast, in the first embodiment, the usage status of the banks of the memory 40 is managed by the valid signal VAL which is always generated earlier than the vertical synchronous signal SYN of the next frame. In a case in which all of the banks are being used, the busy signal BSY is outputted. Therefore, image data of the next frame can reliably be suppressed.

Further, as is clear from comparing FIG. 3 and FIG. 4, in the conventional motion picture processing device, failure processing is carried out two times in the motion estimation processing and the encoding processing on the image data #1. Therefore, from the image data #1 to image data #7, taking-in of the two image data #4 and #6 is suppressed. In contrast, in the motion picture processing device of the first embodiment, only the taking-in of the one image data #5 is suppressed, and processing of a large amount of image data is possible.

In accordance with the motion picture processing device of the first embodiment, the judging of the failure condition is carried out by the usage status of the banks BK1 through BK3 of the memory 40. Namely, by counting the valid signal VAL of the input circuit 10A and the end signal END3 of the encoding circuit 30 at the counter 75, the usage status of the banks BK1 through BK3 is judged, and taking-in of image data at the input circuit 10A is suppressed by the busy signal BSY. In this way, even if the time needed for the motion estimation processing and the encoding processing is the same as in the conventional art, the occurrence of failure can be suppressed, the time over which processing is not carried out can be shortened, and the amount of image data which can be processed can be increased. Therefore, there is the advantage that a deterioration in quality of the motion picture can be reduced.

Second Embodiment

Figure 5:
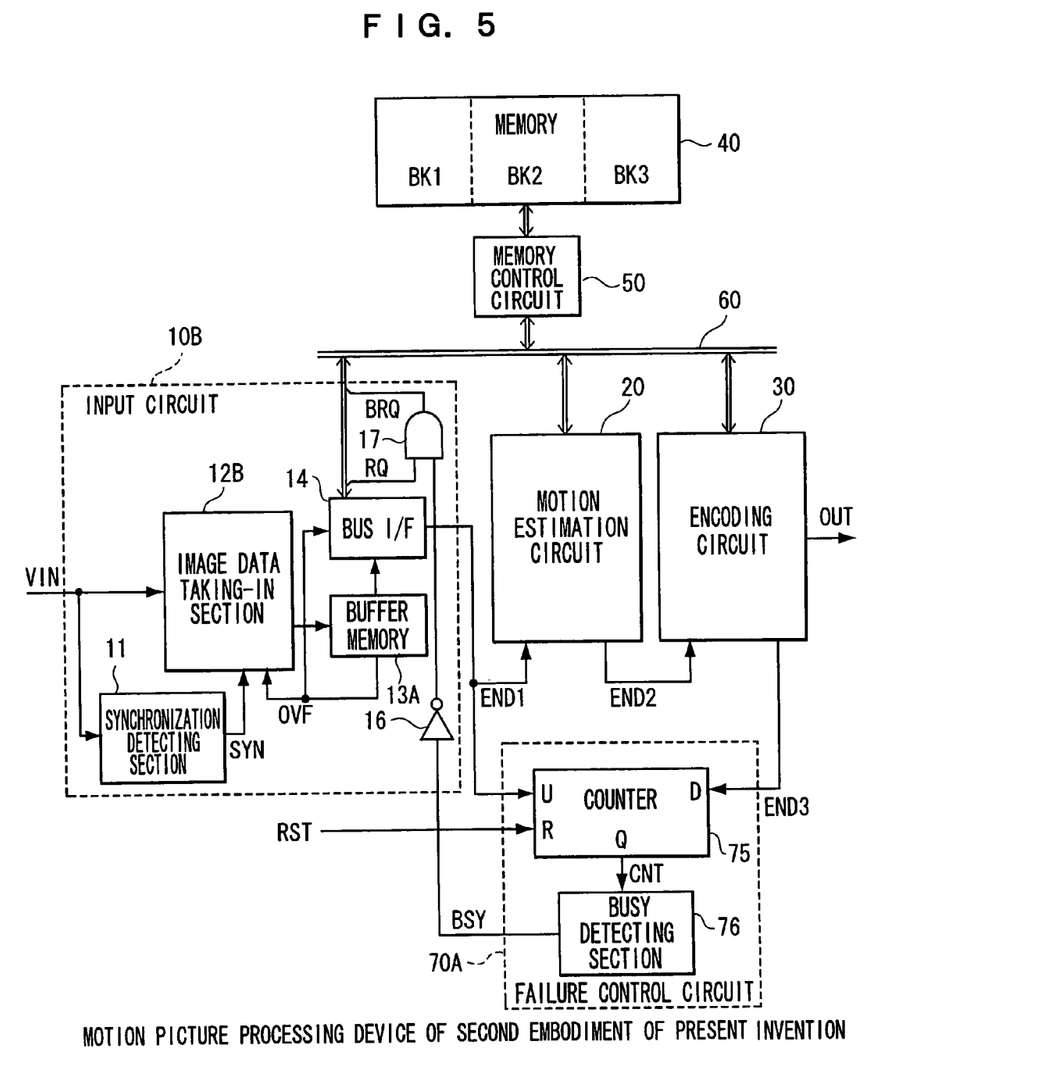
FIG. 5 is a structural drawing of a motion picture processing device showing a second embodiment of the present invention.

FIG. 5 is a structural drawing of a motion picture processing device showing a second embodiment of the present invention. Elements in FIG. 5 which are common to those in FIG. 1 are denoted by common reference numerals.

This motion picture processing device is provided with an input circuit 10B of a slightly different structure, instead of the input circuit 10A in FIG. 1. Namely, the input circuit 10B takes-in the image data from the image signal VIN, and writes the image data to the memory 40 in units of one frame. The input circuit 10B has: the synchronization detecting section 11 detecting and outputting the vertical synchronous signal SYN from the image signal VIN; an image data taking-in section 12B which takes-in the image data from the image signal VIN in accordance with the vertical synchronous signal SYN; a buffer memory 13A temporarily holding the taken-in image data; and the bus I/F 14 for writing the image data, which is held in the buffer memory 13A, to the memory 40 via the bus 60.

The input circuit 10B further has a two-input AND 17. A bus right request signal RQ from the bus I/F 14 is supplied to one input terminal of the AND 17. The busy signal BSY from the failure control circuit 70A is inverted at the inverter 16 and supplied to the other input terminal of the AND 17. A bus right request signal BRQ, which is masked by the inverted busy signal BSY, is outputted from the output terminal of the AND 17 to the bus 60.

Further, at a time when output to the memory 40 is delayed and the buffer memory 13A overflows, the buffer memory 13A outputs an overflow signal OVF to the image data taking-in section 12B. When the overflow signal OVF is supplied, the image data taking-in section 12B stops the processing of taking-in image data, until the vertical synchronous signal SYN of the next frame is supplied. Moreover, the end signal END1 outputted from the bus I/F 14 is supplied as an activation signal for the motion estimation circuit 20, and is supplied as a signal for incrementing the count value to the counter 75 of the failure control circuit 70A. The other structures are similar to FIG. 1.

Figure 6:
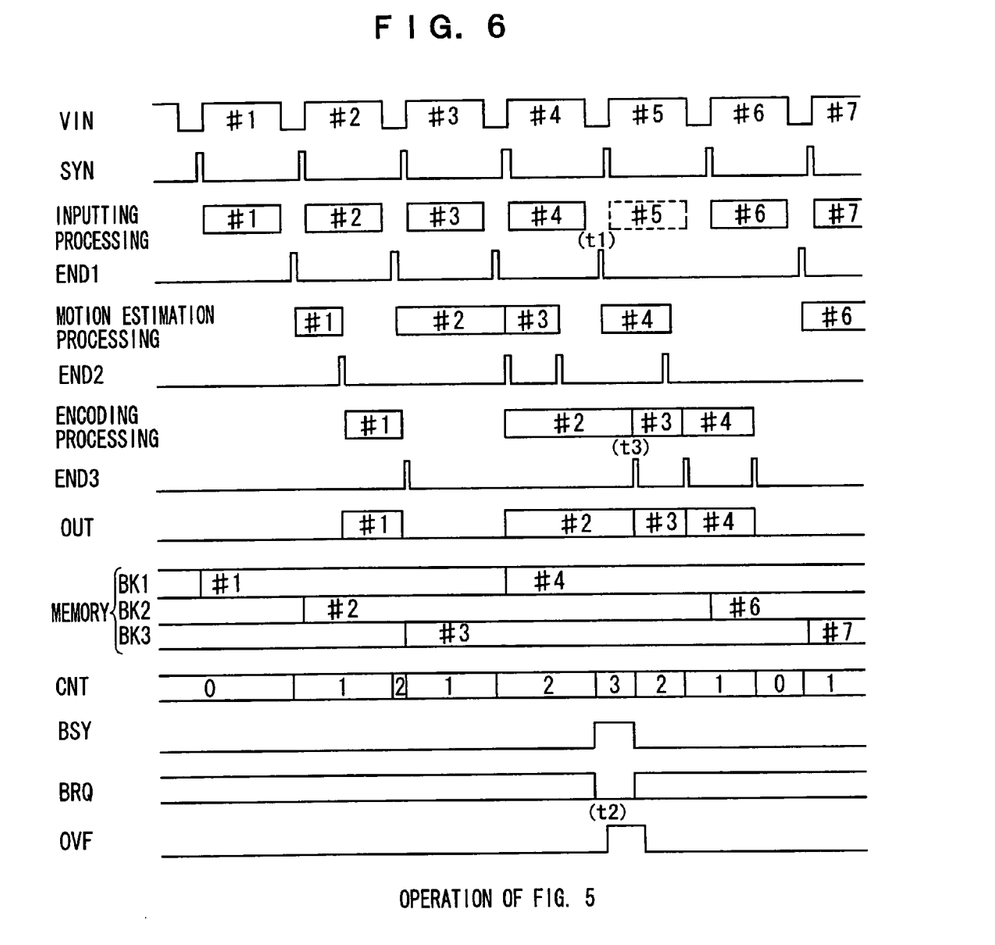
FIG. 6 is a signal waveform diagram showing operation of FIG. 5.

FIG. 6 is a signal waveform diagram showing the operation of FIG. 5. Hereinafter, operation of FIG. 5 will be described with reference to FIG. 6.

(1) The counter 75 in the failure control circuit 70A is reset by the system reset signal RST which is supplied at the time of the start of operation, and the count value CNT becomes 0. In this way, the busy signal BSY outputted from the busy detecting section 76 becomes "L".

(2) The synchronization detecting section 11 of the input circuit 10B detects the vertical synchronization intervals from the image signal VIN supplied from the video camera or the like, and outputs the vertical synchronous signal SYN to the image data taking-in section 12B. At this time, because the buffer memory 13A is not overflowing, the overflow signal OVF is not outputted. In this way, the image data taking-in section 12B starts the taking-in of the image data #1 from the time corresponding to a set image data amount, and successively stores the taken-in image data #1 in the buffer memory 13A. On the other hand, the bus I/F 14 successively writes, to the bank BK1 of the memory 40, the image data #1 which is stored in the buffer memory 13A. At this time, because the busy signal BSY is "L", the AND 17 is open, and the bus right request signal RQ outputted from the bus I/F 14 is outputted to the bus 60 as is as the bus right request signal BRQ. When the bus I/F 14 writes, to the bank BK1, all of the image data #1 stored in the buffer memory 13A, the bus I/F 14 outputs the pulse-shaped end signal END1 to the motion estimation circuit 20 and the failure control circuit 70A.

(3) The count value CNT of the counter 75 in the failure control circuit 70A is increased due to the end signal END1 supplied from the input circuit 10B, and becomes 1. Namely, this shows that one bank of the memory 40 is being used.

(4) The motion estimation circuit 20 is activated by the end signal END1 supplied from the input circuit 10A, and starts motion estimation processing. In this motion estimation processing, the image data #1 stored in the bank BK1 of the memory 40, and the image data therebefore which are stored in the banks BK2, BK3, are read-out as needed and motion information is extracted, and the extracted processing results are written to the bank BK1. At the point in time when processing of the image data #1 ends, the motion estimation circuit 20 outputs the pulse-shaped end signal END2 to the encoding circuit 30.

(5) The encoding circuit 30 is activated by the end signal END2 supplied from the motion estimation circuit 20, and starts encoding processing. In the encoding processing, the image data #1 and the results of the motion estimation processing stored in the bank BK1 of the memory 40 are read-out, MPEG-4 encoded data is generated and the reconstructed image is stored in the memory 40, and is outputted to the exterior as the output data OUT. At the point in time when the encoding processing of the image data #1 ends, the encoding circuit 30 outputs the pulse-shaped end signal END3 to the failure control circuit 70A.

(6) The count value CNT of the counter 75 in the failure control circuit 70A is decreased by 1 due to the end signal END3 supplied from the encoding circuit 30. Namely, this means that one of the banks which was being used in the memory 40 has been released.

In above (1) through (6), description is given of the operations of the respective circuits structuring the pipeline processing circuit, by focusing on the initial image data #1 which is supplied as the image signal VIN. However, similar processings on the image data from the second image data #2 on are carried out continuously and in parallel by the input circuit 10B, the motion estimation circuit 20, and the encoding circuit 30.

(7) The count value CNT of the counter 75 in the failure control circuit 70A is increased by 1 due to the end signal END1 supplied from the input circuit 10B, and is decreased by 1 due to the end signal END3 supplied from the encoding circuit 30. Namely, the count value CNT of the counter 75 represents the number of banks of the memory 40 which are being used. Accordingly, a case in which the count value CNT is 3 means that all of the banks of the memory 40 are being used and there does not exist a bank for the writing of image data of a new frame. Therefore, as shown at time t1 in FIG. 6, when the count value CNT becomes 3 due to the end signal END1, the busy signal BSY outputted from the busy detecting section 76 becomes "H".

(8) At the input circuit 10B, when the supplied busy signal BSY becomes "H", the bus right request signal RQ is masked by the AND 17, and the writing of image data from the buffer memory 13A to the memory 40 is stopped. Therefore, the image data within the buffer memory 13A suddenly increases, and as shown at time t2, the overflow signal OVF outputted from the buffer memory 13A becomes "H". In this way, the buffer memory access of the image data taking-in section 12B and the bus I/F 14 returns to the head address, and the write address of the bus I/F 14 to the memory 40 returns to the head address of the bank. Then, the image data taking-in section 12B stops processing until the next vertical synchronous signal SYN is detected. Accordingly, taking-in of the image data #5 is suppressed.

(9) At time t3, when the end signal END3 is outputted from the encoding circuit 30, the count value CNT of the counter 75 becomes 2, and the busy signal BSY becomes "L". The AND 17 thereby opens. In this way, when the next vertical synchronous signal SYN is detected, the processing of taking-in the next image data by the image data taking-in section 12B is restarted.

Figure 7:
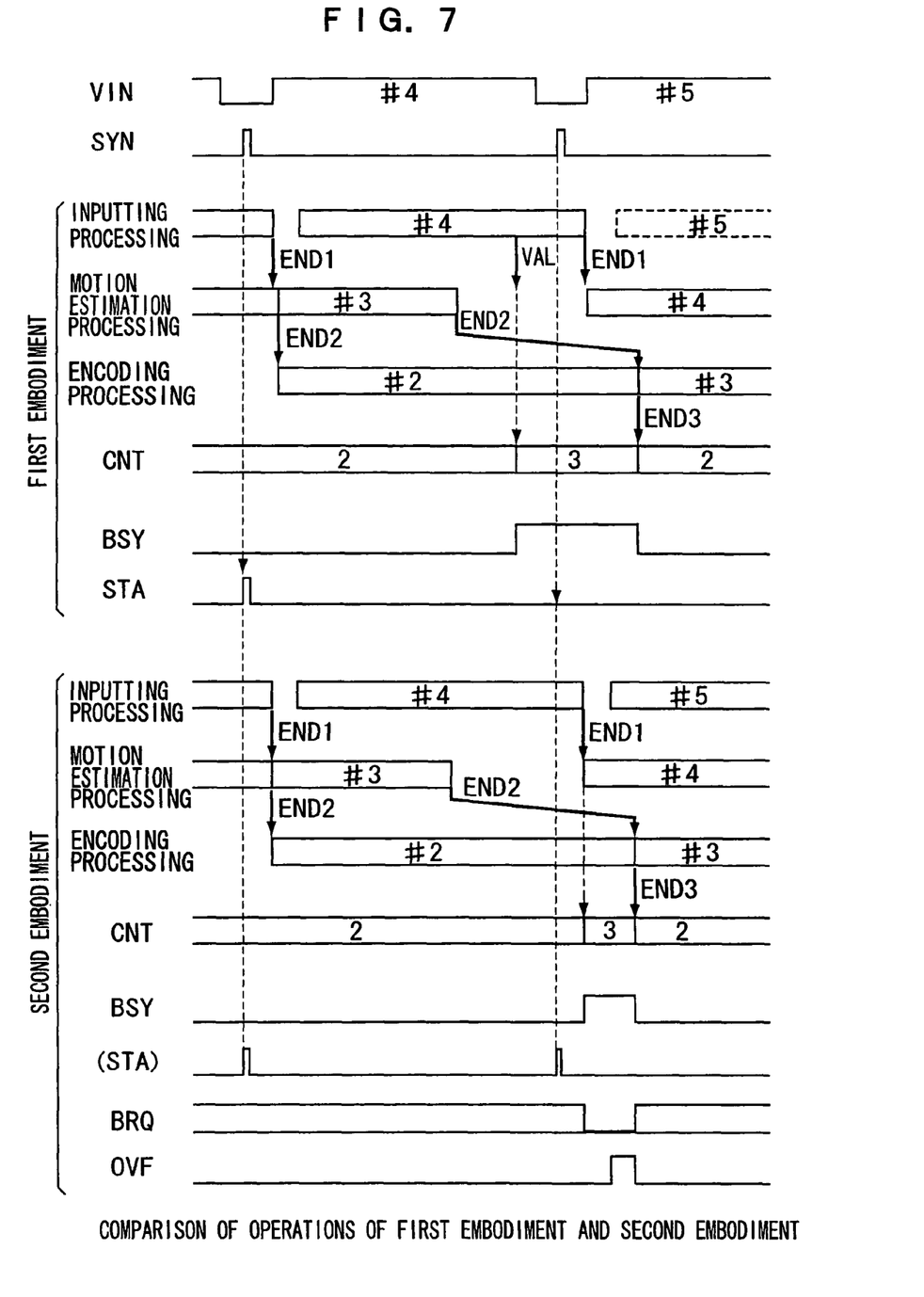
FIG. 7 is a signal waveform diagram for comparing and explaining the operations of the first and second embodiments.

FIG. 7 is a signal waveform diagram for comparative explanation of the operations of the first embodiment (FIG. 1) and the second embodiment (FIG. 5).

In the first embodiment, at the point in time when image data of one frame is taken-into the buffer memory 13, i.e., at the point in time when the valid signal VAL is outputted, it is considered that one bank of the memory 40 is used, and the counter 75 increments the count value. On the other hand, in the second embodiment, at the point in time when all of the image data in the buffer memory 13A is written to the memory 40, i.e., at the point in time when the end signal END1 is outputted, it is considered that one bank of the memory 40 is used, and the counter 75 increments the count value. Accordingly, the timing at which the busy signal BSY is outputted is later in the second embodiment. Further, when the busy signal BSY is outputted, in the first embodiment, the start signal STA for the image data taking-in section 12A during the time period when the busy signal BSY is being outputted is suppressed, and in the second embodiment, the operation of the image data taking-in section 12B is stopped at the point in time when the buffer memory 13A overflows. In this way, in the second embodiment, the amount of image data which can be processed can be increased as compared with the first embodiment, and therefore, there is the advantage that deterioration in quality of the motion picture can be further reduced.

Note that the present invention is not limited to the above-described embodiments, and various modifications are possible. For example, there are the following modified examples.

(a) The encoding format at the encoding circuit 30 is not limited to MPEG-4.

(b) The number of circuits carrying out parallel processing by pipeline processing is not limited to the three circuits which are the input circuit, the motion estimation circuit and the encoding circuit.

(c) The number of banks of the memory 40 is not limited to 3, and it suffices for the number of banks to be greater than or equal to the number of circuits which carry out parallel processing by pipeline processing. In this case, the busy detecting section 76 of the failure control circuit 70A must be structured to output the busy signal BSY when the count value of the counter 75 reaches the number of the banks of the memory 40.

(d) The structures of the input circuits 10A, 10B and the failure control circuit 70A are not limited to the exemplified structures, and it suffices for them to be structures which have similar functions. For example, in a case in which the vertical synchronous signal SYN is supplied from the video camera separately from the image signal VIN, the synchronization detecting section 11 is not necessary. Moreover, the failure control circuit 70A is structured so as to output the busy signal BSY for stopping taking-in to the input circuit 10A, 10B, but, in the same way as in the conventional failure control circuit 70, the failure control circuit 70A may output the operation enabling signal ENA which inverts the busy signal BSY.

Embodiments of the present invention are described above, but the present invention is not limited to the embodiments as will be clear to those skilled in the art.

One aspect of the present invention provides a motion picture processing device having an input circuit, a motion estimation circuit, an encoding circuit, and a failure control circuit as follows.

The input circuit has: a buffer memory temporarily holding image data which is supplied at a constant period in accordance with a synchronous signal; an image data taking-in section starting taking-in of the image data in accordance with the synchronous signal when an enabling signal is being supplied, and outputting a valid signal at a point in time when taken-in image data of one screen is stored in the buffer memory; and a bus I/F storing the image data of the one screen, which is held in the buffer memory, via a common bus in one region of a memory circuit which has three or more regions, and, when the bus I/F ends storing, the bus I/F outputs a first end signal.

The motion estimation circuit is connected to the memory circuit via the common bus, and searches motion of an image on the basis of latest image data stored in the one region of the memory circuit and image data therebefore stored in other regions, and generates motion data and stores the motion data in a same region as the latest image data. When the motion estimation circuit ends storing, the motion estimation circuit outputs a second end signal.

The encoding circuit is connected to the memory circuit via the common bus, and, when the first end signal is supplied, the encoding circuit compresses and encodes the latest image data and the motion data which are stored in the one region of the memory circuit and outputs an output signal to an exterior. When the encoding circuit ends output to the exterior, the encoding circuit outputs a third end signal.

The failure control circuit has: a counter counting a number of regions in use at the memory circuit by incrementing a count value due to the valid signal and decrementing the count value due to the third end signal; and an enabling signal outputting section outputting the enabling signal when the count value of the counter is less than a number of regions, and stopping output of the enabling signal when the count value reaches the number of regions.

In the present aspect, the counter is used which increments the count value due to the valid signal which is outputted from the image data taking-in section when, at the input circuit, image data of one screen is taken-into the buffer memory which temporarily holds the image data which is supplied at a constant period in accordance with the synchronous signal, and which decrements the count value due to the third end signal which is outputted when the outputting, from the encoding circuit to the exterior, of the output signal which is compressed and encoded ends. When this count value is less than the number of regions of the memory circuit, the enabling signal is outputted. When the count value reaches the number of regions, output of the enabling signal is stopped. In this way, only in cases in which all of the regions of the memory circuit are being used is the output of the enabling signal stopped and the taking-in of image data suppressed. Therefore, as compared with a conventional motion picture processing device, the number of image data for which taking-in is suppressed is reduced, and processing of a large amount of image data is possible. Accordingly, there is the effect that an output signal of a motion picture which has little deterioration in quality is obtained.

What is claimed is:

1. A motion picture processing device comprising:
an input circuit comprising:
a buffer memory temporarily holding image data which is supplied at a constant period in accordance with a synchronous signal,
an image data taking-in section starting taking-in of the image data in accordance with the synchronous signal when an enabling signal is being supplied, and outputting a valid signal at a point in time when taken-in image data of one screen is stored in the buffer memory, and a bus interface storing the image data of the one screen, which is held in the buffer memory, via a common bus in one region of a memory circuit which has three or more regions, and, when the bus interface ends storing, the bus interface outputs a first end signal;

a motion estimation circuit connected to the memory circuit via the common bus, and searching motion of an image on the basis of latest image data stored in the one region of the memory circuit and image data therebefore stored in other regions, and generating motion data and storing the motion data in a same region as the latest image data, and, when the motion estimation circuit ends storing, the motion estimation circuit outputs a second end signal;

an encoding circuit connected to the memory circuit via the common bus, and, when the first end signal is supplied, the encoding circuit compresses and encodes the latest image data and the motion data which are stored in the one region of the memory circuit and outputs an output signal to an exterior, and, when the encoding circuit ends outputting, the encoding circuit outputs a third end signal; and a failure control circuit comprising:
  a counter counting a number of regions in use at the memory circuit by incrementing a count value due to the valid signal and decrementing the count value due to the third end signal, and
  an enabling signal outputting section outputting the enabling signal when the count value of the counter is less than a number of regions of the memory circuit, and stopping output of the enabling signal when the count value reaches the number of regions of the memory circuit.

2. A motion picture processing device comprising:
an input circuit comprising:
  a buffer memory temporarily holding image data which is supplied at a constant period in accordance with a synchronous signal, and outputting an overflow signal when the image data of a given amount or more is accumulated,
  an image data taking-in section which, while the overflow signal is not being outputted, starts taking-in of the image data in accordance with the synchronous signal and stores the taken-in image data in the buffer memory, and which, when the overflow signal is outputted, stops taking-in of the image data until a next synchronous signal is supplied, and
  a bus interface which, when an enabling signal is being supplied, stores the image data held in the buffer memory via a common bus in one region of a memory circuit having three or more regions, and, when the bus interface ends storing, the bus interface outputs a first end signal;

a motion estimation circuit connected to the memory circuit via the common bus, and searching motion of an image on the basis of latest image data stored in the one region of the memory circuit and image data therebefore stored in other regions, and generating motion data and storing the motion data in a same region as the latest image data, and, when the motion estimation circuit ends storing, the motion estimation circuit outputs a second end signal;

an encoding circuit connected to the memory circuit via the common bus, and, when the second end signal is supplied, the encoding circuit compresses and encodes the latest image data and the motion data stored in the one region of the memory circuit and outputs an output signal to an exterior, and, when the encoding circuit ends outputting, the encoding circuit outputs a third end signal; and a failure control circuit comprising:
  a counter counting a number of regions in use at the memory circuit by incrementing a count value due to the first end signal and decrementing the count value due to the third end signal, and
  an enabling signal outputting section outputting the enabling signal when the count value of the counter is less than a number of regions of the memory circuit, and stopping output of the enabling signal when the count value reaches the number of regions of the memory circuit.

* * * * *